US012518730B2

(12) United States Patent
Tu et al.

(10) Patent No.: US 12,518,730 B2
(45) Date of Patent: Jan. 6, 2026

(54) NOISE REDUCTION METHOD AND APPARATUS, TEST METHOD AND APPARATUS, ELECTRONIC DEVICE, AND STORAGE MEDIUM

(71) Applicant: VERISILICON MICROELECTRONICS (SHANGHAI) CO., LTD., Shanghai (CN)

(72) Inventors: Shaobo Tu, Shanghai (CN); Shuai Li, Shanghai (CN)

(73) Assignee: VERISILICON MICROELECTRONICS (SHANGHAI) CO., LTD., Shanghai (CN)

( * ) Notice: Subject to any disclaimer, the term of this patent is extended or adjusted under 35 U.S.C. 154(b) by 292 days.

(21) Appl. No.: 18/234,615

(22) Filed: Aug. 16, 2023

(65) Prior Publication Data

US 2024/0177702 A1 May 30, 2024

(30) Foreign Application Priority Data

Nov. 29, 2022 (CN) ......................... 202211510551.3

(51) Int. Cl.
*G10K 11/178* (2006.01)

(52) U.S. Cl.
CPC .. *G10K 11/17823* (2018.01); *G10K 11/17873* (2018.01); *G10K 2210/1081* (2013.01); *G10K 2210/3023* (2013.01); *G10K 2210/3027* (2013.01); *G10K 2210/3028* (2013.01); *G10K 2210/3032* (2013.01); *G10K 2210/3057* (2013.01)

(58) Field of Classification Search
CPC ....... G10K 11/17823; G10K 11/17873; G10K 2210/1081; G10K 2210/3023; G10K 2210/3027; G10K 2210/3028; G10K 2210/3032; G10K 2210/3057
USPC ........................................................ 381/71.11
See application file for complete search history.

(56) References Cited

U.S. PATENT DOCUMENTS 8,155,346 B2 * 4/2012 Yoshizawa ............ G01S 3/8083 381/92
12,288,566 B1 * 4/2025 Ganguly ............. G10L 21/0264
2012/0162471 A1 * 6/2012 Sekiya ................ G10L 21/0208 348/231.4

(Continued)

*Primary Examiner* — Carolyn R Edwards
*Assistant Examiner* — Friedrich Fahnert
(74) *Attorney, Agent, or Firm* — BCF LLP

(57) ABSTRACT

Provided are a noise reduction method and apparatus, a test method and apparatus, an electronic device, and a storage medium, relating to the fields of acoustics and audio. The noise reduction method includes: obtaining an environmental noise and obtaining an environmental spectrum feature of the environmental noise; obtaining a spectrum feature-filter coefficient correspondence; obtaining a target spectrum feature unit from the spectrum feature-filter coefficient correspondence according to the environmental spectrum feature; obtaining a filter coefficient in a filter coefficient unit corresponding to the target spectrum feature unit in the spectrum feature-filter coefficient correspondence as an environmental filter coefficient; and generating noise reduction audio according to the environmental filter coefficient.

5 Claims, 4 Drawing Sheets

(56) References Cited

U.S. PATENT DOCUMENTS

| | | | | |
|---|---|---|---|---|
| 2019/0108837 | A1* | 4/2019 | Christoph | G10L 15/30 |
| 2023/0095174 | A1* | 3/2023 | Kandade Rajan | G10L 25/84 704/200 |

* cited by examiner

NOISE REDUCTION METHOD AND APPARATUS, TEST METHOD AND APPARATUS, ELECTRONIC DEVICE, AND STORAGE MEDIUM

CROSS-REFERENCE TO RELATED APPLICATION

The present disclosure claims the priority to Chinese patent application with the filing number 2022115105513 filed on Nov. 29, 2022 with the Chinese Patent Office, the contents of which are incorporated herein by reference in entirety.

TECHNICAL FIELD

The present disclosure relates to the fields of acoustics and audio, and in particular, to a noise reduction method and apparatus, a test method and apparatus, an electronic device, and a storage medium.

BACKGROUND

With the increasing frequency of the use of earphones, the use quality of the earphones is seriously affected by an environmental noise. Conventional noise reduction means mainly includes sound insulation, material absorption, and the like; however, due to the limitation of factors such as arrangement space, material properties, and cost, the application of conventional methods is not ideal. Therefore, active noise reduction starts to gradually enter the public life. Different from the conventional noise reduction means, the active noise control is to use a noise reduction sound wave that has an inverted waveform from the environmental noise and is generated by a filter in a built-in processing chip through a principle of sound wave interference cancellation, so as to play noise reduction sound waves to offset an original environmental noise, thereby achieving environmental noise elimination.

Due to a limited computing capacity of a built-in chip, the active noise reduction earphones in the prior art generally calculate a fixed noise reduction filter coefficient offline, and the environmental noise directly passes through a filter with the fixed coefficient to obtain an inverted waveform of the noise corresponding to the fixed coefficient, and then is played by a speaker. However, sound is directional, and filter coefficients corresponding to the noises in different directions are also greatly different, so that the most suitable coefficient cannot be determined according to the sounds in different directions by using a noise reduction filter generated by a single coefficient at present, resulting in poor noise reduction effect.

SUMMARY

An objective of the present disclosure is to provide a noise reduction method and apparatus, a test method and apparatus, an electronic device, and a storage medium, which can determine the most suitable filter coefficient according to a direction of a noise, so as to improve a noise reduction effect.

According to a first aspect, the present disclosure provides a noise reduction method. The method includes: obtaining an environmental noise and obtaining an environmental spectrum feature of the environmental noise: obtaining a spectrum feature-filter coefficient correspondence, wherein the spectrum feature-filter coefficient correspondence is a correspondence between a plurality of spectrum feature units and a plurality of filter coefficient units, each of the spectrum feature unit corresponds to a unique filter coefficient unit, and the plurality of spectrum feature units are spectrum features of audio signals in a plurality of different directions collected by an audio collection device: obtaining, as an environmental filter coefficient, a target spectrum feature unit from the spectrum feature-filter coefficient correspondence according to the environmental spectrum feature; obtaining a filter coefficient in a filter coefficient unit corresponding to the target spectrum feature unit in the spectrum feature-filter coefficient correspondence: and generating a noise reduction audio according to the environmental filter coefficient.

In an optional implementation, the obtaining an environmental spectrum feature of the environmental noise includes: obtaining one or more of a discrete degree, a harmonic parameter, and a convergence degree of a spectrum of the environmental noise as the environmental spectrum feature.

In an optional implementation, the method further includes, before the obtaining an environmental spectrum feature of the environmental noise: removing an audio signal with frequency lower than a first preset threshold and that with a frequency higher than a second preset threshold from the environmental noise, wherein the second preset threshold is greater than the first preset threshold.

In an optional implementation, the plurality of spectrum feature units are spectrum features of the same audio signal in the plurality of different directions.

In an optional implementation, the obtaining a target spectrum feature unit from the plurality of spectrum feature units according to the environmental spectrum feature includes: calculating separately a similarity between the environmental spectrum feature and each of the spectrum feature units: and obtaining the target spectrum feature unit according to the similarity.

In an optional implementation, the calculating separately a similarity between the environmental spectrum feature and each of the spectrum feature units includes: calculating separately a Euclidean distance between the environmental spectrum feature and each of the spectrum feature units: and characterizing the similarity using the Euclidean distance.

According to a second aspect, the present disclosure provides a filter coefficient test method applied in a filter coefficient test system, wherein the filter coefficient test system includes an audio collection device, an audio playing device, an audio analysis device, and a position adjusting device. The method includes: controlling, by the position adjusting device, the audio playing device to sequentially play a preset audio in a plurality of different directions of the audio collection device: collecting separately, by the audio collection device, a sound of the preset audio played by the audio playing device in the plurality of different directions to obtain multiple input audios: and obtaining separately, by the audio analysis device, a spectrum feature of each of the input audios, calculating separately a corresponding filter coefficient according to each of the spectrum features, and constructing a spectrum feature-filter coefficient correspondence between the filter coefficient and the spectrum feature.

According to a third aspect, the present disclosure provides a filter coefficient test system. The system includes: an audio collection device, an audio playing device, an audio analysis device, and a position adjusting device, wherein the position adjusting device is configured to control the audio playing device to sequentially play a preset audio in a plurality of different directions of the audio collection device: the audio playing device is configured to sequentially play the preset audio in a plurality of different directions of the audio collection device under a control of the position adjusting device: the audio collection device is configured to collect separately a sound of the preset audio played by the audio playing device in the plurality of different directions to obtain multiple input audios: and the audio analysis device is configured to obtain separately a spectrum feature of each of the input audios, calculate separately a corresponding filter coefficient according to each of the spectrum features, and construct a spectrum feature-filter coefficient correspondence between the filter coefficient and the spectrum feature.

According to a fourth aspect, the present disclosure provides a noise reduction apparatus. The noise reduction apparatus includes: an audio obtaining module, configured to obtain an environmental noise: a feature obtaining module, configured to obtain an environmental spectrum feature of the environmental noise: a parameter determining module, configured to obtain a spectrum feature-filter coefficient correspondence, wherein the spectrum feature-filter coefficient correspondence is a correspondence between a plurality of spectrum feature units and a plurality of filter coefficient units, each of the spectrum feature units corresponds to a unique filter coefficient unit, and the plurality of spectrum feature units are spectrum features of audio signals in a plurality of different directions collected by an audio collection device, and the parameter determining module is configured to obtain, as an environmental filter coefficient, a filter coefficient in a filter coefficient unit corresponding to the target spectrum feature unit in the spectrum feature-filter coefficient correspondence: and an audio generation module, configured to generate a noise reduction audio according to the environmental filter coefficient.

According to a fifth aspect, the present disclosure provides an electronic device. The electronic device includes: at least one processor: and a memory, an audio collection device and an audio playing device that are communicatively connected to the at least one processor, wherein the audio collection device is configured to collect an environmental noise, the memory stores instructions that are executable by the at least one processor, and the instructions are executed by the at least one processor to enable the at least one processor to perform the noise reduction method according to any one of the foregoing implementations, so as to generate a noise reduction audio according to the environmental noise: and the audio playing device is configured to play the noise reduction audio.

According to a sixth aspect, the present disclosure provides a computer-readable storage medium. The computer-readable storage medium stores a computer program, wherein the computer program is executed by a processor to perform the noise reduction method according to any one of the foregoing implementations is implemented.

According to the noise reduction method, the test method, the noise reduction apparatus, the electronic device, and the storage medium provided in the embodiments of the present disclosure, after the environmental noise is obtained, a spectrum analysis is performed on the environmental noise to obtain a spectrum feature of the environmental noise as an environmental spectrum feature, and then a target spectrum feature unit is obtained from a spectrum feature-filter coefficient correspondence of a pre-stored spectrum feature and filter coefficient according to the environmental spectrum feature, wherein since the spectrum feature units in the pre-stored spectrum feature-filter coefficient correspondence are spectrum features of audio signals in a plurality of different directions collected by an audio collection device, the target spectrum feature unit includes direction information of sound: a filter coefficient that corresponds to the target spectrum feature unit is obtained from the spectrum feature-filter coefficient correspondence of the spectrum feature and the filter coefficient as an environmental filter coefficient, wherein the environmental filter coefficient is an optimal filter coefficient in this direction, that is, the most suitable filter coefficient is determined according to the direction of the noise, and the noise reduction effect can be improved by generating the noise reduction audio according to the environmental filter coefficient.

BRIEF DESCRIPTION OF THE DRAWINGS

To describe the technical solutions in embodiments of the present disclosure more clearly, the following briefly describes the accompanying drawings used for describing embodiments. It should be understood that the accompanying drawings show only some embodiments of the present disclosure, and therefore should not be considered as a limitation on the scope. Those ordinary skilled in the art may still derive other related drawings from these accompanying drawings without creative efforts.

DETAILED DESCRIPTION OF THE EMBODIMENTS

Figure 1:
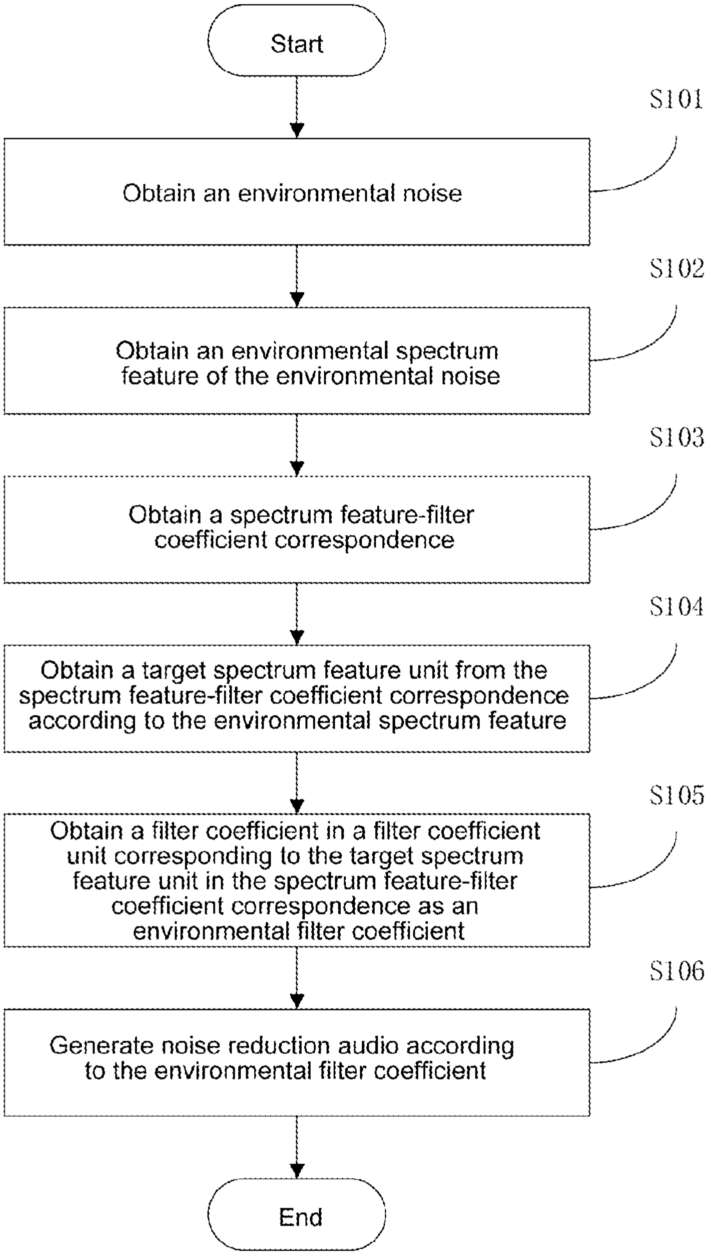
FIG. 1 is a schematic flowchart of a noise reduction method according to Embodiment 1 of the present disclosure.

To make objectives, technical solutions, and advantages of embodiments of the present disclosure clearer, the following clearly and completely describes the technical solutions in embodiments of the present disclosure with reference to the accompanying drawings in embodiments of the present disclosure. It is clear that the described embodiments are some but not all of embodiments of the present disclosure. Generally, components of embodiments of the present disclosure described and shown in the accompanying drawings herein may be arranged and designed in various configurations.

Therefore, the following detailed descriptions of embodiments of the present disclosure provided in the accompanying drawings are not intended to limit the scope of the present disclosure that claims protection, but merely to represent selected embodiments of the present disclosure. All other embodiments obtained by those ordinary skilled in the art based on embodiments of the present disclosure without creative efforts shall fall within the protection scope of the present disclosure.

It should be noted that similar reference numerals and letters indicate similar items in the following accompanying drawings, and therefore, once an item is defined in one of the accompanying drawings, no further definition or explanation is required in the following accompanying drawings.

In the description of the present disclosure, it should be noted that an orientation or position relationship indicated by terms "upper", "lower", "inner", "outer", or the like is an orientation or position relationship based on the accompanying drawings, or an orientation or position relationship that the product of the present disclosure is usually placed when in use. These terms are merely used to facilitate and simplify description of the present disclosure, instead of indicating or implying that a mentioned apparatus or element must have a specific orientation or be constructed and operated in a specific orientation, and therefore the terms cannot be construed as a limitation on the present disclosure.

In addition, the terms "first", "second", and the like are merely intended for differentiated description, and should not be construed as an indication or an implication of relative importance.

It should be noted that the features in the embodiments of the present disclosure can be combined with each other without conflict.

Embodiment 1 of the present disclosure provides a noise reduction method applied to a noise reduction apparatus, and as shown in FIG. 1, the noise reduction method includes the following steps:

Step S101: obtaining an environmental noise.

In different embodiments of the present disclosure, an environmental noise may be obtained by using different methods, for example, in this embodiment, a sound collection device may be disposed in the noise reduction apparatus, and an environmental sound of a current environment where the noise reduction apparatus is located is collected in real time by the sound collection device as the environmental noise. In other embodiments of the present disclosure, other manners may also be used, for example, a sound collection apparatus may be disposed outside the noise reduction apparatus, wherein the sound collection apparatus is connected to the noise reduction apparatus, and an environmental sound is collected and obtained by the sound collection apparatus and then is transmitted to the noise reduction apparatus as the environmental noise. This may be specifically flexibly set and used based on an actual requirement.

Step S102: obtaining an environmental spectrum feature of the environmental noise.

After the environmental noise is obtained, spectrum analysis can be performed on the environmental noise through an audio analysis algorithm to obtain a spectrum of the environmental noise, and a spectrum feature of the environmental noise can be obtained according to the calculated spectrum as an environmental spectrum feature. In this embodiment, a fast Fourier transform (FFT) algorithm may be used as an audio analysis algorithm to perform a spectrum analysis on the environmental noise to obtain the environmental spectrum feature. It may be understood that using the FFT algorithm to perform the spectrum analysis on the environmental noise to obtain the environmental spectrum feature is merely a specific example in this embodiment and does not constitute a limitation on this embodiment. In other embodiments of the present disclosure, it is possible to perform the spectrum analysis on the environmental noise by using other spectrum analysis algorithms such as a chirp Z-transform algorithm, a Goertzel algorithm, and other types of spectrum analysis algorithms to obtain the environmental spectrum feature. This may be specifically flexibly used based on an actual situation.

Further, in this embodiment, the environmental spectrum feature includes one or more of a discrete degree, a harmonic parameter, and a convergence degree of the spectrum, that is, in this embodiment, one or more of the discrete degree, the harmonic parameter, and the convergence degree of the spectrum of the environmental noise is obtained as the environmental spectrum feature by using the FFT algorithm. It may be understood that the fact that the foregoing environmental spectrum feature includes one or more of a discrete degree, a harmonic parameter, and a convergence degree of the spectrum is merely a specific example in this embodiment, and in other embodiments of the present disclosure, the environmental spectrum feature may also be other types of spectrum features including a high frequency-low frequency distribution feature, an energy distribution of a spectrum graph, and the like. This may be specifically flexibly used based on an actual requirement.

Step S103: obtaining a spectrum feature-filter coefficient correspondence.

Specifically, in this embodiment, the spectrum feature-filter coefficient correspondence is a corresponding table pre-stored in the noise reduction apparatus, wherein the spectrum feature-filter coefficient correspondence is a correspondence between a plurality of spectrum feature units and a plurality of filter coefficient units, each spectrum feature unit corresponds to a unique filter coefficient unit, and the plurality of spectrum feature units are spectrum features of audio signals in a plurality of different directions collected by an audio collection device and. That is, the spectrum feature-filter coefficient correspondence between the spectrum feature and the filter coefficient is obtained by multiple measurements in an experimental environment in advance, and then the spectrum feature-filter coefficient correspondence is stored in the corresponding table, wherein the spectrum feature obtained by each measurement is stored in a cell of the corresponding table to form a spectrum feature unit, the filter coefficient obtained by each measurement is stored in a cell of the corresponding table to form a filter coefficient unit, and each spectrum feature unit corresponds to a unique filter coefficient unit. It may be understood that, in embodiments of the present disclosure, each spectrum feature unit corresponds to a unique filter coefficient unit, and each filter coefficient unit may correspond to a unique spectrum feature unit, or may correspond to a plurality of spectrum feature units. Specifically, this may be correspondingly set based on an actual measurement result.

In this embodiment, the plurality of spectrum feature units are spectrum features of audio signals in a plurality of different directions that are collected by the audio collection device. That is, the preset audio is played separately in a plurality of different directions of the audio collection device, the audio collection device collects the sound played by the preset audio in a single direction each time to obtain audio signals, the audio signal is subjected to a spectrum analysis by using the same audio analysis algorithm as that in the step S102 to obtain a spectrum feature of the audio signal, then an optimal filter coefficient of the preset audio of the audio signal in the current direction is calculated, the measured spectrum feature of the audio signal is stored in a corresponding table as the spectrum feature in the current direction to form a spectrum feature unit, and the calculated optimal filter coefficient is stored in the corresponding table as the filter coefficient in the current direction to form a filter coefficient unit uniquely corresponding to the spectrum feature unit.

Preferably, in an embodiment of the present disclosure, the plurality of spectrum feature units are spectrum features of the same audio signal in a plurality of different directions, that is, the same preset audio is played in a plurality of different directions of the audio collection device separately. The same audio signal is played in a plurality of different directions, so that the audio collection device collects the spectrum features in a plurality of different directions, the influence of different audio signals on the spectrum feature can be reduced, and an association degree between the spectrum feature and the audio direction is improved.

It may be understood that the foregoing spectrum feature-filter coefficient correspondence is a corresponding table pre-stored in the noise reduction apparatus, which is merely a specific example in this embodiment and does not constitute a limitation on this embodiment. In other embodiments of the present disclosure, other manners may also be used, for example, the corresponding table may also be stored in a server and then sent to the noise reduction apparatus through a communication device. Specifically, this may be flexibly set based on an actual requirement.

Step S104: obtaining a target spectrum feature unit from the spectrum feature-filter coefficient correspondence according to the environmental spectrum feature.

Specifically, in this embodiment, a spectrum feature unit that is in the spectrum feature-filter coefficient correspondence and that has the same spectrum feature as the environmental spectrum feature is served as a target spectrum feature unit. It may be understood that the foregoing is merely a specific example in this embodiment and does not constitute a limitation on this embodiment. In other embodiments of the present disclosure, other methods may also be used, for example, a spectrum feature unit that is in the spectrum feature-filter coefficient correspondence and that has the highest similarity to the environmental spectrum feature is selected as a target spectrum feature unit. This may be specifically flexibly selected and used based on an actual requirement.

Further, in an embodiment of the present disclosure, if a spectrum feature unit in the spectrum feature-filter coefficient correspondence that has the highest similarity to the environmental spectrum feature is selected as a target spectrum feature unit, it is required to calculate a similarity between the environmental spectrum feature and a spectrum feature stored in each of the spectrum feature units, and then a spectrum feature unit with the highest similarity is selected as the target spectrum feature unit. Herein, a Euclidean distance between the environmental spectrum feature and the spectrum feature stored in each of the spectrum feature units can be calculated as the similarity between the environmental spectrum feature and the spectrum feature stored in each of the spectrum feature units, and when the Euclidean distance is used to characterize the similarity, the spectrum feature unit that has the shortest Euclidean distance with the environmental spectrum feature is most similar to the environmental spectrum feature. The Euclidean distance, also referred to as Euclidean metric, is a distance definition that refers to the true distance between two points in a multi-dimensional space, or a natural length of a vector (i.e., the distance from this point to an origin).

Step S105: obtaining a filter coefficient in a filter coefficient unit corresponding to the target spectrum feature unit in the spectrum feature-filter coefficient correspondence as an environmental filter coefficient.

Specifically, in this step, a filter coefficient unit uniquely corresponding to the target spectrum feature is obtained in the spectrum feature-filter coefficient correspondence, and a filter coefficient in the filter coefficient unit is taken as the environmental filter coefficient.

Step S106: generating a noise reduction audio according to the environmental filter coefficient.

Specifically, in this step, a filter is constructed according to an environmental filter coefficient, and the filter is used to perform a filtering processing on the environmental noise, thereby generating a noise reduction audio that is the inverse of the environmental noise. The subsequent noise reduction apparatus or the audio playing device connected to the noise reduction apparatus plays the noise reduction audio to offset the environmental noise, thereby achieving the effect of eliminating the environmental noise.

In the noise reduction method provided by this embodiment, after the environmental noise is obtained, a spectrum analysis is performed on the environmental noise to obtain a spectrum feature of the environmental noise as an environmental spectrum feature, and then a target spectrum feature unit is obtained from a spectrum feature-filter coefficient correspondence of a pre-stored spectrum feature and filter coefficient according to the environmental spectrum feature, wherein since the spectrum feature units in the pre-stored spectrum feature-filter coefficient correspondence are spectrum features of audio signals in a plurality of different directions collected by an audio collection device, the target spectrum feature unit includes direction information of sound; a filter coefficient that corresponds to the target spectrum feature unit is obtained from the spectrum feature-filter coefficient correspondence of the spectrum feature and the filter coefficient as an environmental filter coefficient, wherein the environmental filter coefficient is an optimal filter coefficient in this direction, that is, the most suitable filter coefficient is determined according to the direction of the noise, and the noise reduction effect can be improved by generating the noise reduction audio according to the environmental filter coefficient.

Figure 2:
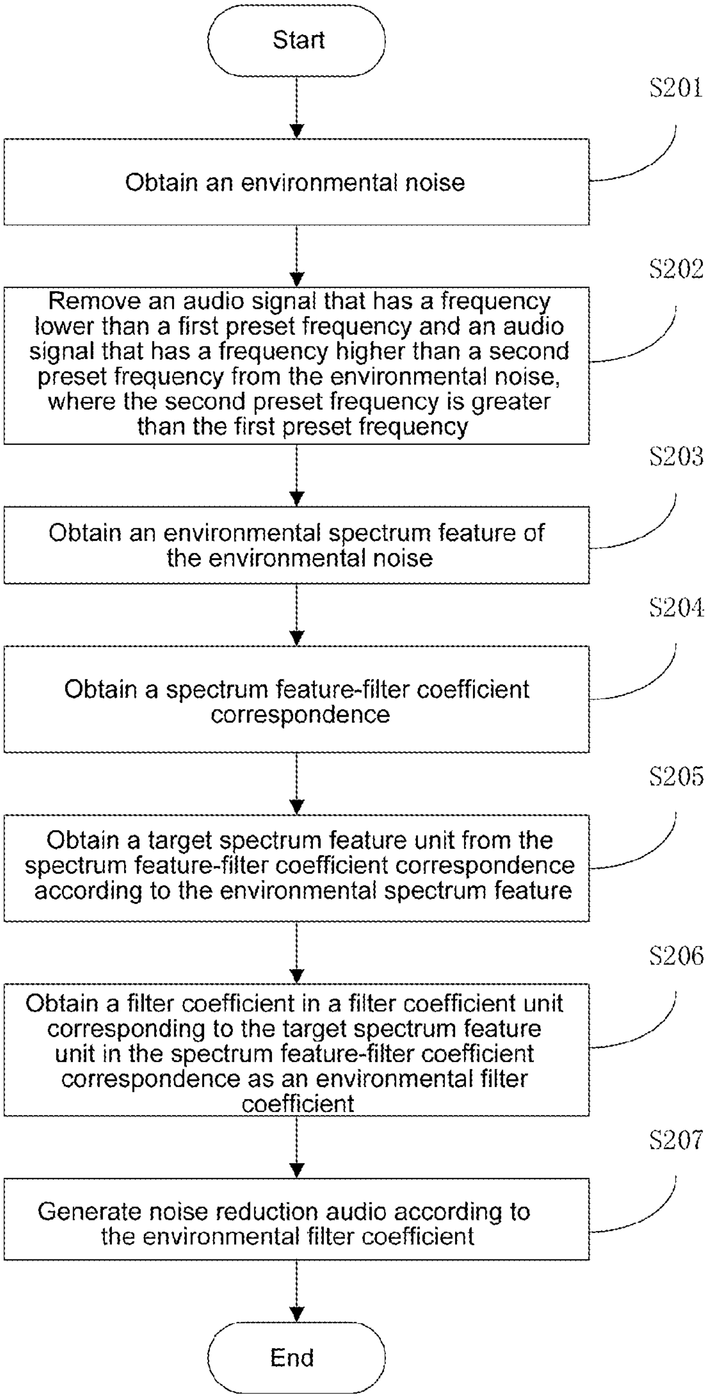
FIG. 2 is a schematic flowchart of a noise reduction method according to Embodiment 2 of the present disclosure.

Embodiment 2 of the present disclosure provides a noise reduction method applied to a noise reduction apparatus, and as shown in FIG. 2, the noise reduction method includes the following steps:

Step S201: obtaining an environmental noise.

Step S202: removing an audio signal with a frequency lower than a first preset frequency and a an audio signals with a frequency higher than a second preset frequency from the environmental noise, wherein the second preset frequency is greater than the first preset frequency.

In this step, the first preset frequency and the second preset frequency are only preset frequency thresholds. In an actual application process, the audio signal with too low frequency and too high frequency accounts for a relatively small proportion of the actually collected environmental noise, however, the frequency of this part of audio may have some extreme values, including maxima and minima, which greatly affects the result of obtaining an environmental spectrum feature of an entire environmental noise, therefore, in this embodiment, the audio signal with the frequency lower than the first preset frequency and the audio signals with the frequency higher than the second preset frequency is removed from the environmental noise before obtaining the environmental spectrum feature of the environmental noise, so as to form a new environmental noise. The environmental noise in the subsequent steps of this embodiment is the new environmental noise processed in this step.

Preferably, in some embodiments of the present disclosure, the first preset frequency is 20 Hz, and the second preset frequency is 20 KHz. It may be understood that the setting of the first preset frequency being 20 Hz and the second preset frequency being 20 KHz is merely a specific example in this embodiment and does not constitute a limitation on this embodiment. In other embodiments of the present disclosure, the preset frequency may also be other values, which may be specifically set based on an actual requirement. A part of the audio signals with the frequency lower than 20 Hz and the audio signals with the frequency higher than 20 KHz in the environmental noise are removed to form a new environmental noise, wherein since the part of the audio signals with the frequency lower than 20 Hz and the audio signals with the frequency higher than 20 KHz cannot be heard by human ears, the removal of the part of the audio signals with the frequency lower than 20 Hz and the audio signals with the frequency higher than 20 KHz from the environmental noise does not have any negative impact on the noise reduction effect. In addition, after a part of the audio signals with the frequency lower than 20 Hz and the audio signals with the frequency higher than 20 KHz is removed from the environmental noise, the computation amount of processing the environmental noise can be reduced, and meanwhile, the accuracy of the environmental spectrum feature obtained subsequently according to the environmental noise can be higher, so that the selection accuracy of the environmental filter coefficient is improved, and the noise reduction effect is enhanced.

Step S203: obtaining an environmental spectrum feature of the environmental noise.

Step S204: obtaining a spectrum feature-filter coefficient correspondence.

Step S205: obtaining a target spectrum feature unit from the spectrum feature-filter coefficient correspondence according to the environmental spectrum feature.

Step S206: obtaining a filter coefficient in a filter coefficient unit corresponding to the target spectrum feature unit in the spectrum feature-filter coefficient correspondence as an environmental filter coefficient.

Step S207: generating a noise reduction audio according to the environmental filter coefficient.

It may be understood that in the present disclosure, step S201 and steps S203 to S207 in the noise reduction method provided in Embodiment 2 are substantially the same as steps S101 to S106 in Embodiment 1, and the specific reference may be made to the detailed description of the foregoing embodiment.

The noise reduction method provided in this embodiment retains all technical features of Embodiment 1, and also has all technical effects of Embodiment 1, wherein the specific reference may be made to the specific description of Embodiment 1. In addition, in Embodiment 2, a part of the audio signals with the frequency lower than the first preset frequency and the audio signals with the frequency higher than the second preset frequency are removed from the environmental noise to form a new environmental noise. The audio signal with too low frequency and too high frequency accounts for a relatively small proportion of the actually collected environmental noise, however, the frequency of this part of audio may have some extreme values, including maxima and minima, which greatly affects the result of obtaining an environmental spectrum feature of an entire environmental noise, therefore, the removal of the part of the audio signals with the frequency lower than the first preset frequency and the audio signals with the frequency higher than the second preset frequency from the environmental noise can make the accuracy of the environmental spectrum feature obtained subsequently according to the environmental noise higher, thereby improving the selection accuracy of the environmental filter coefficient and enhancing the noise reduction effect. In addition, after the audio signals with the frequency lower than the first preset frequency and the audio signals with the frequency higher than the second frequency are removed from the environmental noise, the computation amount of processing the environmental noise can be reduced.

Figure 3:
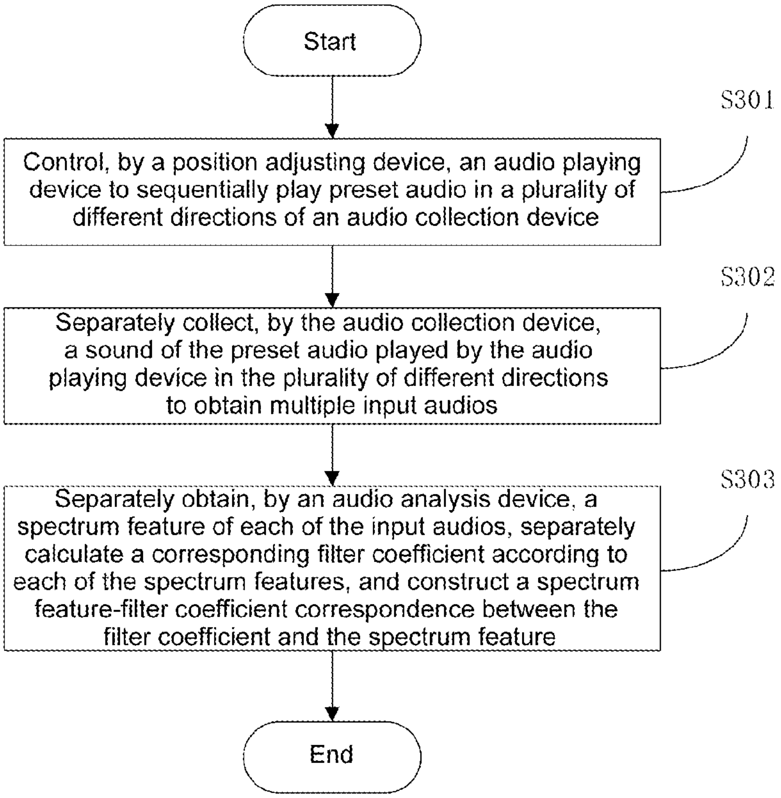
FIG. 3 is a schematic flowchart of a filter coefficient test method according to Embodiment 3 of the present disclosure.

Embodiment 3 of the present disclosure provides a filter coefficient test method applied to a filter coefficient test system, wherein the filter coefficient test system includes an audio collection device, an audio playing device, an audio analysis device, and a position adjusting device. Specifically, as shown in FIG. 3, the filter coefficient test method includes the following steps:

Step S301: controlling, by the position adjusting device, the audio playing device to sequentially play a preset audio in a plurality of different directions of the audio collection device.

Specifically, in this step, the position adjusting device is configured to adjust a position of the audio playing device, so that the audio playing device is located in different directions of the audio collection device. After the position adjusting device adjusts the position of the audio playing device each time, the audio playing device plays the preset audio at the current position. After the audio playing device plays the preset audio at a position, the position adjusting device adjusts the audio playing device to other positions, until the audio playing device plays the preset audio in all directions of the audio collection device. It may be understood that a position where the audio playing device plays the preset audio may be a position set in the position adjusting device in advance, or a position randomly generated according to an algorithm. This may be specifically flexibly set based on an actual requirement.

Step S302: collecting separately, by the audio collection device, a sound of the preset audio played by the audio playing device in the plurality of different directions to obtain multiple input audios.

In this step, the audio collection device collects a sound generated by the audio playing device playing the preset audio to obtain a sound played by the audio playing device at various positions, that is, in all directions of the audio collection device, so as to obtain multiple input audios.

Step S303: obtaining separately, by the audio analysis device, a spectrum feature of each of the input audios, calculating separately a corresponding filter coefficient according to each of the spectrum features, and constructing a spectrum feature-filter coefficient correspondence between the filter coefficient and the spectrum feature.

In this step, the audio analysis device performs audio analysis on each of the multiple input audios by using the same audio analysis algorithm as that in the noise reduction method provided in the foregoing Embodiments 1 and 2 to obtain a spectrum feature of each of the multiple input audios, then an optimal filter coefficient under each of different spectrum features is calculated, the spectrum feature of the measured audio signal is stored in a corresponding table to form a spectrum feature unit, the calculated optimal filter coefficient under each of the spectrum features is stored in a corresponding table to form a filter coefficient unit uniquely corresponding to the spectrum feature unit, and a spectrum feature-filter coefficient correspondence between the filter coefficient and the spectrum feature is constructed.

The filter coefficient test method provided in Embodiment 3 of the present disclosure uses the filter coefficient test system to pre-measure outside the noise reduction apparatus to obtain a spectrum feature-filter coefficient correspondence between the spectrum features of the audio signals in different directions and an optimal filter coefficient under each of the spectrum features, wherein the spectrum feature-filter coefficient correspondence can be directly used by the noise reduction apparatus without professional calculation by the noise reduction apparatus, so that a requirement on the computing capacity of the chip of the noise reduction apparatus is greatly reduced in the noise reduction process, and meanwhile the noise reduction effect is ensured.

Figure 4:
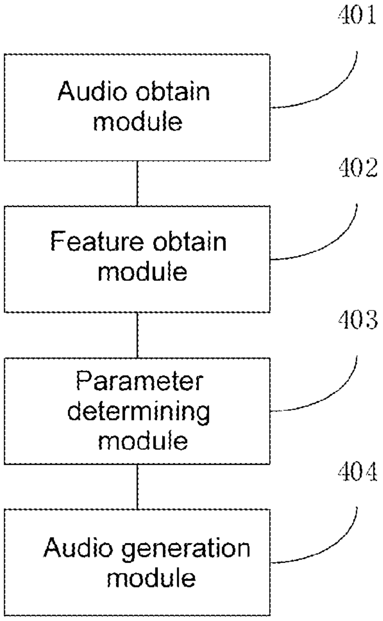
FIG. 4 is a schematic structural diagram of a noise reduction apparatus according to Embodiment 4 of the present disclosure.

Embodiment 4 of the present disclosure relates to a noise reduction apparatus. As shown in FIG. 4, the noise reduction apparatus includes: an audio obtaining module 401, wherein the audio obtaining module 401 is configured to obtain an environmental noise, and in different embodiments of the present disclosure, the audio obtaining module 401 may be an audio collection device such as a microphone, or a communication apparatus that is configured to communicate with the audio collection device to obtain an environmental noise collected by the audio collection device, which may be specifically set based on an actual situation: a feature obtaining module 402, wherein the feature obtaining module 402 is configured to obtain an environmental spectrum feature of the environmental noise: a parameter determining module 403, wherein the parameter determining module 403 is configured to obtain a spectrum feature-filter coefficient correspondence, and the spectrum feature-filter coefficient correspondence is a correspondence between a plurality of spectrum feature units and a plurality of filter coefficient units, wherein each spectrum feature unit corresponds to a unique filter coefficient unit, and the plurality of spectrum feature units are spectrum features of audio signals in a plurality of different directions that are collected by an audio collection device, and the parameter determining module 403 is configured to obtain a filter coefficient in a filter coefficient unit corresponding to the target spectrum feature unit in the spectrum feature-filter coefficient correspondence as an environmental filter coefficient: and an audio generation module 404, wherein the audio generation module 404 is configured to generate noise reduction audio according to the environmental filter coefficient.

In the noise reduction apparatus provided in Embodiment 4 of the present disclosure, after the audio obtaining module 401 obtains the environmental noise: the feature obtaining module 402 performs spectrum analysis on the environmental noise to obtain a spectrum feature of the environmental noise as an environmental spectrum feature, and then the parameter determining module 403 obtains a target spectrum feature unit from a spectrum feature-filter coefficient correspondence of a pre-stored spectrum feature and filter coefficient according to the environmental spectrum feature, wherein since the spectrum feature units in the pre-stored spectrum feature-filter coefficient correspondence are spectrum features of audio signals in a plurality of different directions collected by an audio collection device, data of the target spectrum feature unit includes direction information of sound: the parameter determining module 403 obtains a filter coefficient that corresponds to the target spectrum feature unit from the spectrum feature-filter coefficient correspondence of the spectrum feature and the filter coefficient as an environmental filter coefficient, wherein the environmental filter coefficient is an optimal filter coefficient in this direction, that is, the most suitable filter coefficient is determined according to the direction of the noise: and the audio generation module 404 generates the noise reduction audio according to the environmental filter coefficient, so that the noise reduction effect can be improved.

Figure 5:
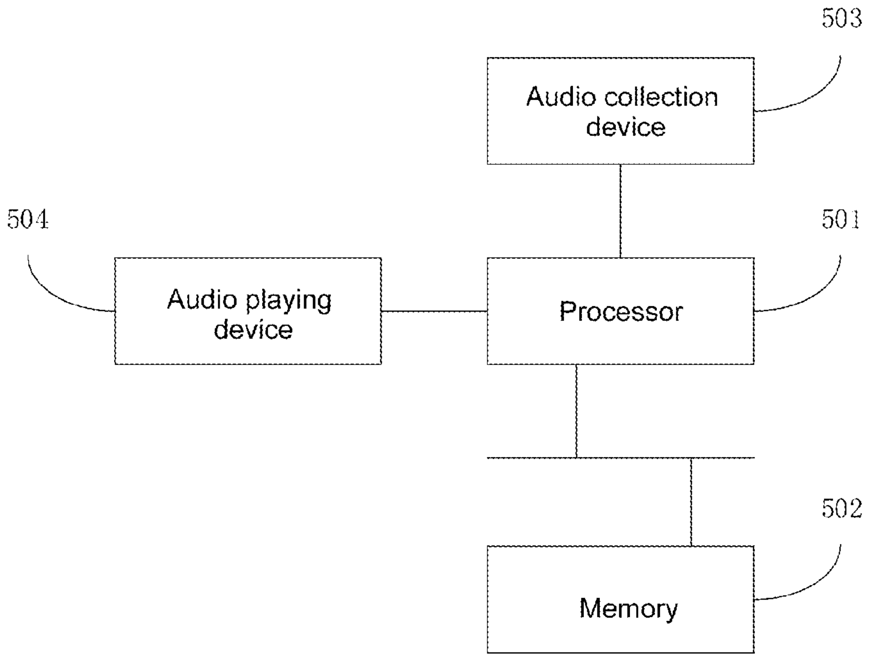
FIG. 5 is a schematic structural diagram of an electronic device according to Embodiment 5 of the present disclosure.

Embodiment 5 of the present disclosure relates to an electronic device. As shown in FIG. 5, the electronic device includes: at least one processor 501, and a memory 502, an audio collection device 503 and an audio playing device 504 that are communicatively connected to the at least one processor 501, wherein the audio collection device 503 is configured to collect an environmental noise, the memory 502 stores instructions that can be executed by the at least one processor 501, and when the instructions are executed by the at least one processor 501, the at least one processor 501 can perform the noise reduction method provided in the foregoing embodiments, so as to generate noise reduction audio according to the environmental noise, and the audio playing device 504 is configured to play the noise reduction audio.

In the above, the memory and the processor are connected by mean of buses, wherein the buses may include any quantity of interconnected buses and bridges, and the buses connect various circuits of one or more processors and the memory together. The buses may further connect various other circuits such as a peripheral device, a voltage stabilizer, and a power management circuit together. These are well known in the art, and therefore are not further described in this specification. A bus interface provides an interface between a bus and a transceiver. The transceiver may be one element or a plurality of elements, such as a plurality of receivers and transmitters, providing units for communicating with various other apparatuses on a transmission medium. The data processed by the processor is transmitted over a wireless medium through an antenna. Further, the antenna further receives data and transmits the data to the processor.

The processor is responsible for bus management and general processing, and may further provide various functions including timing, peripheral interfacing, voltage regulation, power management, and control functions. The memory may be configured to store data used by the processor when performing an operation.

Figure 6:
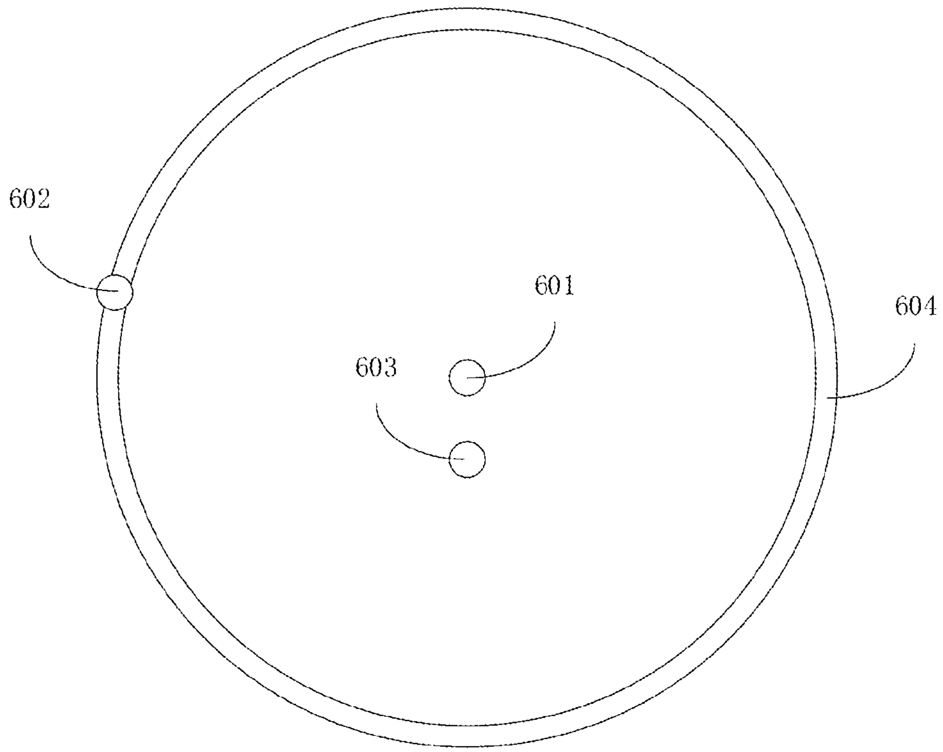
FIG. 6 is a schematic structural diagram of a filter coefficient test system according to Embodiment 6 of the present disclosure.

Embodiment 6 of the present disclosure relates to a filter coefficient test system. As shown in FIG. 6, the filter coefficient test system includes: an audio collection device 601, an audio playing device 602, an audio analysis device 603, and a position adjusting device 604.

In the above, the position adjusting device 604 is configured to control the audio playing device 602 to sequentially play a preset audio in a plurality of different directions of the audio collection device 601. In an actual application process, the position adjusting device 604 may be, for example, a guide rail disposed around the audio collection device 601 as shown in FIG. 6, and the audio playing device 602 rotates around the audio collection device 601 on the guide rail 604, so as to control the audio playing device 602 to sequentially play the preset audio in a plurality of different directions of the audio collection device 601. It may be understood that the position adjusting device 604 being a guide rail disposed around the audio collection device 601 is merely an example in some embodiments of the present disclosure and does not constitute a limitation thereto. In other embodiments of the present disclosure, the position adjusting device 604 may also be other structures such as an automated robot and an automated cart. This may be specifically flexibly set based on an actual requirement.

The audio playing device 602 is configured to sequentially play the preset audio in a plurality of different directions of the audio collection device 601 under control of the position adjusting device 604.

The audio collection device 601 is configured to collect separately a sound generated by playing preset audio in a plurality of different directions by the audio playing device 602 to obtain multiple input audios.

The audio analysis device 603 is configured to obtain separately a spectrum feature of each of the input audios, calculate separately a corresponding filter coefficient according to each of the spectrum features, and construct a spectrum feature-filter coefficient correspondence between the filter coefficient and the spectrum feature.

The filter coefficient test system provided in Embodiment 6 of the present disclosure controls the audio playing device 602 to sequentially play the preset audio in the plurality of different directions of the audio collection device 601 through the position adjusting device 604, so that the audio collection device 601 can collect a sound generated by playing the preset audio in the plurality of different directions to obtain the input audio. Finally, the audio analysis device 603 is configured to obtain a spectrum feature of each of the input audios, calculate separately a corresponding filter coefficient according to each of the spectrum features, and construct a spectrum feature-filter coefficient correspondence between the filter coefficient and the spectrum feature. A spectrum feature-filter coefficient correspondence between the spectrum features of the audio signals in different directions and an optimal filter coefficient is obtained through measurement in advance, wherein the spectrum feature-filter coefficient correspondence can be directly used by the noise reduction apparatus without professional calculation by the noise reduction apparatus, so that a requirement on the computing capacity of the chip of the noise reduction apparatus is greatly reduced in the noise reduction process, and mean while the noise reduction effect is ensured.

Embodiment 7 of the present disclosure relates to a computer-readable storage medium storing a computer program. When the computer program is executed by a processor, the foregoing method embodiments are implemented.

Those skilled in the art may understand that all or some of the steps of the method in the foregoing embodiments may be implemented by a program instructing related hardware. The program is stored in a storage medium and includes several instructions for instructing a device (which may be a single-chip microcomputer, a chip, or the like) or a processor to perform all or some of the steps of the methods described in embodiments of the present application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by those skilled in the art within the technical scope disclosed in the present disclosure shall fall within the protection scope of the present disclosure. Therefore, the protection scope of the present disclosure shall be subject to the protection scope of the claims.

What is claimed is:

1. A noise reduction method, comprising steps of:

obtaining an environmental noise, and obtaining an environmental spectrum feature of the environmental noise;

obtaining a spectrum feature-filter coefficient correspondence, wherein the spectrum feature-filter coefficient correspondence is a correspondence between a plurality of spectrum feature units and a plurality of filter coefficient units, each of the spectrum feature units corresponds to a unique filter coefficient unit, and the plurality of spectrum feature units are spectrum features of audio signals in a plurality of different directions collected by an audio collection device;

obtaining a target spectrum feature unit from the spectrum feature-filter coefficient correspondence according to the environmental spectrum feature;

obtaining, as an environmental filter coefficient, a filter coefficient in a filter coefficient unit corresponding to the target spectrum feature unit in the spectrum feature-filter coefficient correspondence; and generating a noise reduction audio according to the environmental filter coefficient;

the method further comprises, before the step of obtaining an environmental spectrum feature of the environmental noise, steps of:

removing an audio signal with a frequency lower than a first preset threshold and that with a frequency higher than a second preset threshold from the environmental noise, wherein the second preset threshold is greater than the first preset threshold.

2. The method according to claim 1, wherein the step of obtaining an environmental spectrum feature of the environmental noise comprises:

obtaining one or more of a discrete degree, a harmonic parameter, and a convergence degree of a spectrum of the environmental noise as the environmental spectrum feature.

3. The method according to claim 1, wherein the plurality of spectrum feature units are spectrum features of a same audio signal in the plurality of different directions.

4. A noise reduction method, comprising steps of:

obtaining an environmental noise, and obtaining an environmental spectrum feature of the environmental noise;

obtaining a spectrum feature-filter coefficient correspondence, wherein the spectrum feature-filter coefficient correspondence is a correspondence between a plurality of spectrum feature units and a plurality of filter coefficient units, each of the spectrum feature units corresponds to a unique filter coefficient unit, and the plurality of spectrum feature units are spectrum features of audio signals in a plurality of different directions collected by an audio collection device;

obtaining a target spectrum feature unit from the spectrum feature-filter coefficient correspondence according to the environmental spectrum feature;

obtaining, as an environmental filter coefficient, a filter coefficient in a filter coefficient unit corresponding to the target spectrum feature unit in the spectrum feature-filter coefficient correspondence; and generating a noise reduction audio according to the environmental filter coefficient;

the step of obtaining a target spectrum feature unit from the spectrum feature-filter coefficient correspondence according to the environmental spectrum feature comprises steps of:

calculating separately a similarity between the environmental spectrum feature and each of the spectrum feature units; and obtaining the target spectrum feature unit according to the similarity.

5. The method according to claim 4, wherein the step of calculating separately a similarity between the environmental spectrum feature and each of the spectrum feature units comprises:

calculating separately a Euclidean distance between the environmental spectrum feature and each of the spectrum feature units; and characterizing the similarity using the Euclidean distance.

* * * * *